March 11, 1969 R. E. BOWLES 3,431,930
DUAL FLUID VORTEX VALVE
Original Filed March 28, 1966

INVENTOR
ROMALD E. BOWLES
BY Hurvitz & Rose
ATTORNEYS

United States Patent Office
3,431,930
Patented Mar. 11, 1969

3,431,930
DUAL FLUID VORTEX VALVE
Romald E. Bowles, Silver Spring, Md., assignor to Bowles Engineering Corporation, Silver Spring, Md., a corporation of Maryland
Continuation of application Ser. No. 538,017, Mar. 28, 1966. This application Oct. 12, 1966, Ser. No. 598,559
U.S. Cl. 137—81.5    19 Claims
Int. Cl. F15c 1/08, 1/12, 1/14

This application is a continuation of application Ser. No. 538,017 filed Mar. 28, 1966, for "Dual Fluid Vortex Valve," now abandoned.

The present invention relates to vortex valves and, more particularly, to a dual-fluid vortex valve capable of operation over a continuous range between delivery of 100 percent of a primary fluid and delivery of 100 percent of a control fluid at a greatly reduced mass flow rate relative to the mass flow rate of the primary fluid.

A difficulty that has been encountered in the field of pure fluid systems has been the inability to provide a hard shut-off of a fluid under reasonable operating pressures without the use of mechanical valves. Hard shut-off of the flow of fluids of a primary fluid can be effected if a sufficiently highly pressurized control fluid is employed. For instance, if a primary fluid is flowing through a pipe from an ingress and towards an egress end and at some point intermediate these two ends a highly pressurized control fluid is introduced, termination of the flow of the primary fluid may be effected. However, the control fluid must have a sufficiently high pressure as to be able to maintain pressure in the pipe at its point of introduction which is at least equal to the pressure of the primary fluid even though the control fluid is flowing unrestrictedly through the pipe to the egress end thereof. It is obvious that under these circumstances, the control fluid must be at a considerably higher pressure than the primary fluid and further the mass flow of the control fluid is probably of the same order of magnitude as the mass flow of the primary fluid. Also, it is highly likely in a scheme of this type that the control fluid will mix with the secondary fluid upstream of its point of introduction discharging into the primary supply so that, when it is again wished to produce flow of the primary fluid, an indeterminate mixture of the primary and control fluids initially appears at the egress end of the pipe, an undesirable effect.

There are other possible schemes for providing hard shut-off of a primary fluid by a control fluid, but as far as known to the inventor, in all of these schemes the problems set forth above are encountered; that is, the control fluid must have a considerably higher pressure than the primary fluid, the mass flow of the control fluid when a termination of the primary fluid is effected is either larger than or a considerable proportion of the mass flow of the unrestricted primary fluid, and intermixing of the primary and control fluids occurs in both primary and control fluid supplies upstream of the point of introduction of each fluid.

It is an object of the present invention to provide a vortex valve in which it is possible to provide a complete range of different density primary and control fluids from 100 percent primary fluid to 100 percent control fluid, in which system the control fluid pressure required to produce complete shut-off of the primary fluid is no more than 10 percent higher than the pressure of the primary fluid and in which the mass flow rate of the control fluid, when 100 percent control fluid is flowing, is considerably less than the mass flow rate of 100 percent flow of primary fluid and in which intermixing of control fluid and primary fluid upstream of the point of introduction of either fluid is eliminated.

It is another object of the present invention to provide a dual chamber, dual fluid vortex valve which is quite simple in construction and which is capable of completely terminating flow of a primary fluid by the introduction of a control fluid having a pressure no more than 10 percent larger than the primary fluid pressure.

Another object of the present invention is to provide a pure fluid valve capable of rapid response to control signals for randomly or periodically switching between full primary fluid flow, no primary fluid flow and all intermediate conditions therebetween.

The above and still further objects, features and advantages of the present invention will become apparent upon consideration of the following detailed description of one specific embodiment thereof, especially when taken in conjunction with the accompanying drawing, wherein.

Figure 1:
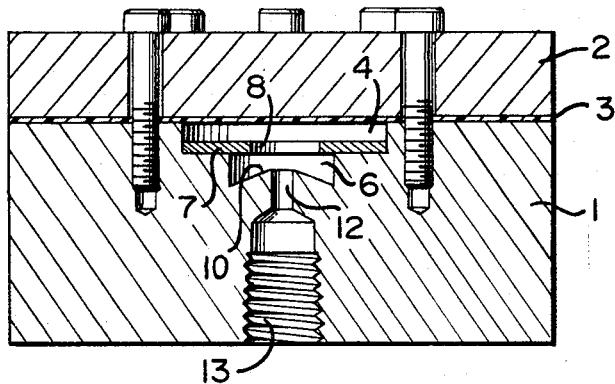
FIGURE 1 is a cross-sectional view of the apparatus of the present invention through the vertical center thereof.
Figure 2:
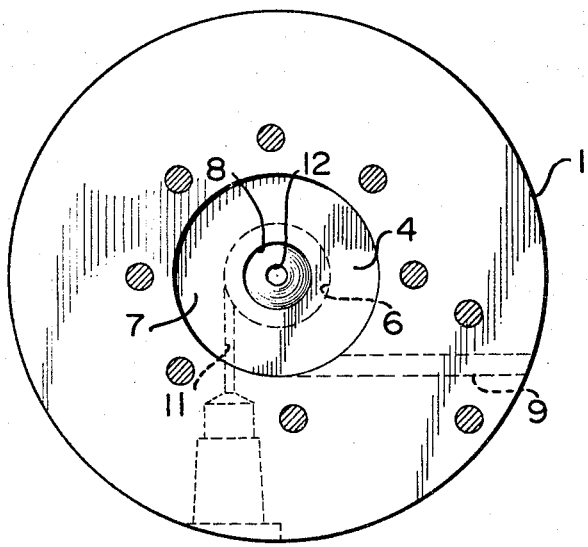
FIGURE 2 is a top view of the apparatus of the present invention.

Referring specifically to FIGURES 1 and 2 of the accompanying drawings, the apparatus of the present invention comprises a lower member 1 and a cover plate 2 which, in the illustrated form is bolted to the member 1, but which may be secured thereto by any suitable means. A gasket 3 is disposed between the members 1 and 2 to provide for a complete fluid seal therebetween. The member 1 has all of the various chambers of the present invention formed therein and has a first hollow cylindrical region 4 formed, in the illustrated embodiment, at the upper edge of the base member 1. The member 1 is provided with a second cylindrical fluid chamber 6 disposed immediately below, coaxial with and in communication with the hollow chamber 4. The lower chamber 6 is smaller than the upper chamber 4 and, although it is not intended to limit the differences in diameter to the specific device illustrated, the difference illustrated is about one-half; that is, the chamber 6 is about one-half the diameter of the chamber 4. A spacer 7 is located between the chambers 4 and 6. The spacer 7 is a flat disc having a hole or aperture 8 therein coaxial with the chambers 4 and 6 and of a lesser diameter than the chamber 4. The reason for this lesser diameter of the aperture 8 than the diameter of chamber 6 is explained subsequently. It should be noted that the lower surface 10 of the chamber 6 slopes upwardly toward the center.

Primary fluid or, more particularly, a high density fluid whose flow is to be controlled is introduced tangentially into the chamber 4 through an inlet passage 9, while a low density control fluid is introduced tangentially into the chamber 6 via a passage 11. Fluid introduced, either into chamber 4 or chamber 6 or a combination of the two when both fluids are flowing, egresses through passage 12 coaxial with the chambers 4 and 6. The passage 12 is, in the illustrated embodiment, coupled via suitable tubing or other fluid conveying means to a load with the tubing being secured to the block 1 via a suitable coupling secured in the enlarged region 13 below the egress orifice 12, as illustrated in FIGURE 1.

It has been found that, with a system of the type described above, when the control fluid is operating at about 90 percent of the pressure of the primary fluid, all of the flow through the egress passage 12 is of primary fluid and that, when the supply pressure of the control fluid is raised to about 110 percent of the primary fluid pressure, fluid flow through the egress passage 12 is 100 percent control fluid. Further, at relative pressure differences between these two extremes, both primary and control fluids egress through the passage 12, the proportions of the two depending upon the relative pressures of the two fluids within the range stipulated above.

Numerous factors affect the operation of this device, some of the factors being independent of one another and others being interrelated. Factors affecting operation, which will be discussed in further detail, are: (1) the difference in radii between the chambers 4 and 6; (2) the spin direction of the two fluids; (3) the use of the divider 7; (4) the use of different density fluids for primary and control purposes; (5) the inward and upward slope of the surface 10 of the chamber 6; introduction of the control flow in the lower chamber and (6) operation of the passage 12 at subsonic and sonic velocities.

Figure 3:
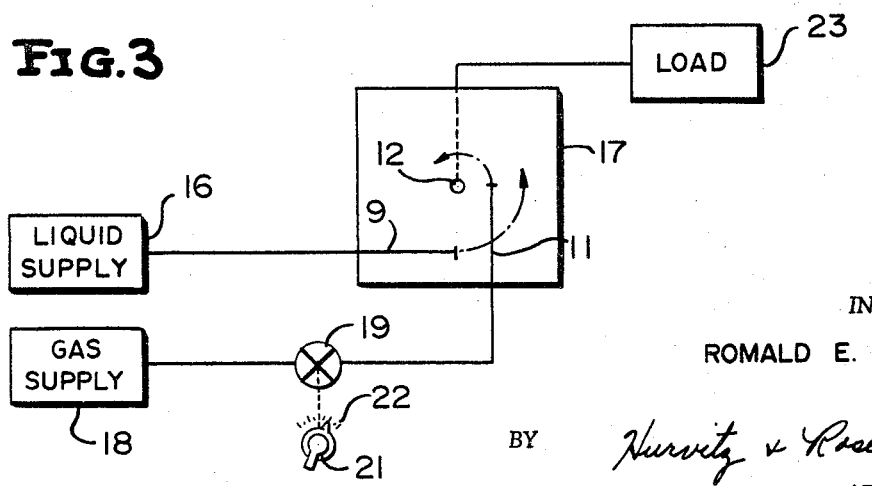
FIGURE 3 is a functional block diagram of an apparatus employing the device of the present invention for control of flow of liquid to a load device.

As has been noted above, the diameter of the upper chamber 4 is usually larger than the diameter of the lower chamber 6. This fact is not an essential element of the device but, as a practical matter, results from various interrelated factors of the system. In a system of the type with which the present invention is to be employed, one such as illustrated in FIGURE 3 of the accompanying drawing, the practical operating pressure of the primary fluid supply is approximately known and the desired mass flow rate of the system under 100 percent primary fluid flow conditions is known. Also, the size of the fluid conduit for handling such a flow rate under prescribed pressure conditions is known and, since the size of the egress passage 12 is usually about the same as the fluid conduit for purposes of impedance matching, the size of the egress passage 12 is known. Thus, the pressure drop in the system other than in the vortex valve can be determined and the difference between the primary pressure source and the sum of pressure drop in the system and the pressure of the fluid required at the load device equals the pressure drop across the vortex valve that can be accepted.

The pressure drop in the vortex valve so far as the primary fluid is concerned is composed of the pressure drop through the vortex chamber and the pressure drop across the aperture (orifice) 8 in the washer 7.

In order to minimize losses in a vortex device, it is necessary to insure that the flow through the egress orifice be uniform particularly about the periphery of the orifice. In order to insure such uniform flow, the ratio of the diameter of the vortex chamber to the diameter of the egress orifice must be a specified minimum depending upon the characteristics of the fluid employed. The value of the ratio may be varied in the range above this minimum in order to adjust the pressure drop in the chamber to a value which, when added to the pressure drop across the orifice 8, which drop can be readily calculated from standard equations, approximately equals the permissible pressure drop across the vortex valve. In the particular device illustrated in the accompanying drawings, the ratio of diameters of the vortex chamber 4 and the orifice 8 is equal to approximately three.

The diameter of the vortex chamber 6 is desirably a minimum in order to minimize the response time of the device to a change in control fluid pressure and to minimize pressure losses therein so that the control fluid pressure may be maintained as small as possible and still effect complete shutoff of the primary fluid. On the other hand, the diameter of the chamber 6 is desirably larger than the diameter of the orifice 8 for at least three specific reasons.

The divider 7 is employed to prevent the primary fluid from appearing in the region of the passage 11 during periods of 100 percent primary fluid flow. It is obvious from the drawing that, if the divider 7 is eliminated, the primary fluid appears at the egress end of the passage 11 and primary fluid may well be introduced into the passage due to local mixing of the fluids. The fact that the primary fluid enters the chamber 6 at a radius or diameter smaller than the diameter of the passage 6 in the device illustrated permits a balancing of static pressures between the primary fluid and the control fluid which occurs at a point which is removed from the egress end of the control flow passage and thus, primary fluid does not enter this passage and contaminate the control fluid supply.

Further, if the primary fluid were allowed to enter the chamber 6 in the region of the entrance of the control fluid, the control fluid, which is usually a gas, would be deflected as it entered the chamber and would tend to splash up into the liquid chamber. This would produce intermixing of the liquid and gas in the liquid chamber and prevent the realization of a well-defined interface between the primary and secondary fluids.

There is still a third important reason for not permitting the gas to enter directly into the liquid region at its point of entry. It will be noted that both the primary and control fluids are introduced tangentially to their respective chambers. If the control fluid can rise directly into the upper chamber 4 before a well-defined vortical rotation is achieved, the control fluid enters the upper chamber along the tangent to the lower chamber and thus, its path is not tangential to the upper chamber. An asymmetrical or elliptical pattern is thus produced. Such a pattern in a vortex device produces quite high energy losses and the system goes into turbulence producing considerable mixing of the two fluids which tends to prevent a sharp interface being formed between the two fluids.

It is stated above that mixing of the primary and control fluids is undesirable if it occurs over the entire volumes of the chambers. It is to be understood that, in a cylindrical region defined generally by the outer periphery or circumference of the aperture 8, considerable mixing does occur when the device is supplying both primary and control fluids to the egress orifice. However, the important fact is not that mixing occurs in the central region of the chamber, but that mixing does not occur in regions which are adjacent the inlet pipes 9 and 11, since if the fluids are mixed in the region of the egress orifice of these pipes, the mixture may enter the pipes and produce undesired results; particularly contamination of the sources of the respective fluids.

The above factors establish in a general way the size of the various elements but a fixed determination of sizes is dependent upon factors directly related to the operating principles of the device.

As pointed out above, it is an object of the present invention to provide complete shut-off of a primary fluid by a control fluid at only a slightly higher pressure than the primary fluid and at the same time to prevent intermixing of the fluids in the passage 9. Conversely, when operating at 100 percent primary fluid flow, it is necessary to prevent the primary fluid from entering the passage 11. This is accomplished by balancing the static pressures of the fluids at a point remote from the passage 9 in the one case and at a point remote from the passage 11 in the other case and maintaining a well-defined interface between the two fluids.

Consider the case of stabilized 100 percent control fluid flow. Under these circumstances, the control fluid fills the lower chamber and extends through the aperture 8 into the upper chamber. Since the primary fluid is no longer flowing, the control fluid is subjected to the total head of the primary fluid. Due to the fact that the control fluid has assumed a vortical flow pattern, it has suffered static pressure loss and a certain loss in passing through the aperture 8. Thus, the control fluid pressure source must be at a higher pressure than the primary fluid to compensate for the two static pressure losses described immediately above. Since the two fluids are at the same pressure at their interface relatively little mixing of the fluid occurs and a definite interface is found. The ability to prevent intermixing of the fluids is enhanced by having both fluids flowing in the same direction.

In the case of 100 percent primary fluid flow, the primary fluid suffers static pressure loss due to vortical flow and flow through the orifice 8. The pressure of the control fluid, since it is no longer flowing, is equal to the total head of the source and thus, the primary fluid source must be at a higher pressure to compensate for the losses due to flow of primary fluid.

Considering the above operating principles, final design of the device of the present invention is determined by selecting chamber and orifice sizes which permit isolation of each of the fluid supplies from the fluid supplied by the other supply under all operating conditions within the design operating ranges. Specifically, the chamber and orifice sizes must be such that static pressure balancing of the fluids under 100 percent flow of one or the other occurs at a region sufficiently remote from passages 9 and 11 to insure their isolation from the other fluid. Additionally, the two fluids should be flowing with the same sense of rotation in order to reduce turbulence at the interface.

Another important feature of the present invention is its ability to provide a large turn-down ratio. By this term is meant the ratio of the total mass flow when only primary fluid is flowing to the total mass flow when only control fluid is flowing. A number of factors may be employed to control the turn-down ratio. The most obvious is the utilization of a low density control fluid and a high density primary fluid. Thus, the control fluid could conceivably be highly heated helium which has a low molecular weight and, when in a highly heated state, has a very low density.

An additional factor increasing the turn-down ratio, if such is desired, may be introduced by operating the device at choked flow through the egress orifice 12 for control fluid. More particularly, choked flow is flow at the sonic velocity of the material. If, for instance, water is the primary fluid, the mass of water delivered is limited to a rate determined by the density of water, the speed of sound in water, 4,970 feet per second, and the area of the orifice 12 while, if only air is flowing, the mass flow is determined by the density of air, the area of the orifice and the speed of sound in air. It is apparent that, under these conditions, a large turn-down ratio may be achieved, since both the speed of sound and the density of water are considerably greater than those of air. It is a known fact that, in a liquid-gas system, a speed of sound lower than the speed of sound of either of the individual materials is achieved in a mixture of materials. Thus, the speed of sound is approximately 4,970 feet per second in water, approximately 1,088 feet per second in air. However, if .001 pound of air is added to a pound of water, the speed of sound of the mixture is approximately 68 feet per second, the speed falling almost linearly from 4,970 feet per second to 68 feet per second over this range. As increasing amounts of air are added, the speed of sound increases monotonically to a speed of 1,088 feet per second, which is the speed of sound in air. By operating over the linear range from 4,970 feet to 68 feet per second, a wide range of control can be achieved with very little control fluid being employed.

Still another increase in the turn-down ratio is effected by operating the orifice at sonic flow rates for the secondary fluid. It is known that, when an orifice, such as orifice 12, is operated at critical flow; that is, at sonic velocity, the effective discharge coefficient is a function of the angle at which the fluid proceeds through the orifice. Specifically, if flow is axially at sonic velocity, then a maximum mass flow through the orifice is achieved. If the fluid is rotating in passing through the orifice, the velocity is sonic but the axial component of flow, which is the component that determines mass flow through the orifice, flows at a rate below sonic velocity.

Thus, when only control fluid is flowing, actual mass flow rates are below sonic velocity. When only the primary fluid is flowing, mass flow is not limited by the sonic velocity of the control flow but only by the sonic velocity of the primary flow which is quite a bit higher. Thus, the turn-down ratio is further improved.

The effect of the upward and inward slope of the lower wall 10 of the chamber 6 in the operation of the valve is not wholly understood but it is known that the presence of the slope increases the turn-down ratio of the system. It is postulated that the slope of the wall 10 imparts an upward momentum to the secondary fluid thus impelling the secondary fluid into the upper chamber 4 rather than permitting the fluid to flow too rapidly through egress orifice 12.

The range of operating pressures for the apparatus is approximately plus or minus 10 percent of the primary fluid static pressure. Thus, as the control fluid is at a pressure of 10 percent less than the primary fluid, only primary fluid flows and, if the control flow is at 110 percent of the primary fluid pressure then only control fluid flows. A series of tests were conducted on the apparatus illustrated in FIGURES 1 and 2. This apparatus was operated with a liquid supply as the primary fluid and a gas as the control fluid. In this particular device, with a gas pressure of 97 p.s.i. and a liquid pressure of 92½ p.s.i., there was 100 percent flow of gas. The unit was again operated with a 102 p.s.i. gas pressure and a 94½ p.s.i. liquid pressure. Again, all of the flow was gas. With liquid pressures of 90 p.s.i. and gas pressures of about 82 p.s.i., the flow was 100 percent liquid. Mass flow rate turn-down ratios of the order of 35 can be achieved when a relatively high density liquid is employed in conjunction with a low density gas.

In the tests described above, the pressure variations required to terminate flows were less than plus or minus 10 percent of the primary fluid pressure. The figure of plus or minus 10 percent covers all systems believed to be of interest presently although, as indicated above, lesser percentages may be employed in many systems thereby providing even better characteristics.

The valve of the present invention is considered of primary importance in the throttling of liquids with a gas since, under these conditions, maximum turn-down ratios may be achieved. However, the apparatus may also operate with two gases or two liquids and significant turn-down ratios obtained if the molecular weights and densities of the two fluids are considerably different with, of course, the higher density fluid being introduced through the upper chamber 4. Further, the control fluid may be a vaporized form of the primary fluid since large differences in density may still be achieved.

Referring specifically to FIGURE 3 of the accompanying drawings, there is illustrated a system for controlling a supply of a primary fluid, a liquid in this case, to a load. For purposes of explanation, the liquid may be combustible and the load may be a furnace. A pressurized liquid supply 16 is connected to the supply passage 9 of a dual chamber vortex valve 17. A pressurized gas supply 18 is connected through a variable pressure regulator 19 to supply passage 11 of the vortex valve 17. The pressure regulator 19 may have its operating member connected to a control knob 21 operating on a calibrated scale 22 so that the particular relative ratios of gas and liquid passing to the egress orifice 12 may be readily dialed against the calibrated scale 22.

Egress passage 12 is connected to a load 23 which, as indicated above, may be a furnace. By appropriate setting of the dial 21, the relative ratio of gas and liquid supplied to load 23 may be controlled and thus, the combustion rate of liquid determined. Appropriate setting for the dial 21 may discontinue the flow of combustible liquid and therefore turn off the furnace by simply changing the setting on the dial 21. Liquid at any desired flow rate may thereafter be introduced to the load 23 and the rate of burning will be initiated at a predetermined rate as determined by the new setting of the dial 21. If it is desired to obtain a maximum turn-down ratio in a system of this type, some form of heating mechanism may be connected in the gas supply line or the gas may be initially heated by some external means.

The control of the pressure regulator or valve 19 may be automatic and, specifically, may be controlled by purely conventional means to maintain a specific temperature in the furnace. A manual override may be employed in conventional manner. It is also apparent that a pure fluid control of the pressure of the control fluid may be employed, pure fluid pressure regulators and controls therefore being well-known in the art.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A pure fluid vortex control device comprising a first generally cylindrical vortex chamber having an end wall, a second generally cylindrical vortex chamber having an end wall, said chambers being coaxial and contiguous, a further wall forming a common end wall of at least a part of each of said chambers opposite each of said end walls, said end wall of said first chamber having an axial egress orifice, said further wall having an axial orifice which is larger than the diameter of said egress orifice of said first chamber and smaller than the diameter of said vortex chambers, means for introducing a first fluid into said first vortex chamber and means for introducing a second fluid into said second vortex chamber having a density different from the density of said first fluid.

2. The combination according to claim 1 wherein said second vortex chamber is of a larger diameter than said first vortex chamber.

3. The combination according to claim 2 wherein said means for introducing the lower density fluid includes means for varying the supply pressure of said lower density fluid over a range of plus or minus 10 percent of the supply pressure of the higher density fluid.

4. The combination according to claim 1 wherein said means for introducing each comprises a passage tangential to its respective chamber at the periphery thereof.

5. The combination according to claim 4 wherein said means for introducing the lower density fluid includes means for varying the supply pressure of said lower density fluid over a range of plus or minus 10 percent of the supply pressure of the higher density fluid.

6. The combination according to claim 5 wherein said means for introducing produce spinning of said fluids in the same direction.

7. The combination according to claim 4 further comprising means for constraining fluid introduced into said second of said chambers from said first of said chambers to enter said second of said chambers rotationally.

8. The combination according to claim 1 wherein said means for introducing the lower density fluid supplies the lower density fluid at a pressure to develop sonic flow through said egress orifice.

9. The combination according to claim 1 wherein the higher density fluid is a liquid and the other fluid is a gas.

10. The combination according to claim 1 further comprising a burning chamber connected to said egress orifice, said higher density fluid being a combustible liquid.

11. The combination according to claim 1 wherein the relative diameters of said second vortex chamber and said axial orifice in said further end wall are such that at 100 percent flow of the higher density fluid through said egress orifice, the pressure of the high density fluid at the periphery of said axial orifice is in balance with the pressure of the other of said fluids.

12. The combination according to claim 1 wherein the relationship between diameters of said second vortex chamber and said axial orifice in said further end wall is at least approximately 3 to 1.

13. The combination according to claim 1 wherein the higher density fluid is introduced into the vortex chamber remote from said egress orifice.

14. The combination according to claim 1 wherein said end wall of said first chamber has a conical upward slope toward said second chamber, said conical wall being coaxial with said chambers.

15. The combination according to claim 14 wherein said second vortex chamber is of a larger diameter than said first vortex chamber.

16. The combination according to claim 15 wherein said means for introducing each comprises a passage tangential to its respective chamber at the periphery thereof.

17. The combination according to claim 15 wherein said means for introducing produce spinning of said fluids in the same direction.

18. The combination according to claim 15 wherein the relative diameters of said second vortex chamber and said axial orifice in said further end wall are such that at 100 percent flow of the higher density fluid through said egress orifice, the pressure of the high density fluid at the periphery of said axial orifice is in balance with the pressure of the other of said fluids.

19. The combination according to claim 14 wherein said means for introducing the lower density fluid supplies the lower density fluid at a pressure to develop sonic flow through said egress orifice.

References Cited

UNITED STATES PATENTS

| | | | |
|---|---|---|---|
| 1,474,603 | 11/1923 | Morse | 239—404 |
| 1,629,288 | 5/1927 | Morse | 239—404 |
| 2,566,788 | 9/1951 | Berggren et al. | 239—404 |
| 3,246,883 | 4/1966 | Ashbrook | 259—4 |
| 3,311,120 | 3/1967 | Palmisano | 137—81.5 X |
| 3,373,759 | 3/1968 | Adams | 137—81.5 |

M. CARY NELSON, *Primary Examiner.*

WILLIAM R. CLINE, *Assistant Examiner.*